United States Patent
Huang

(10) Patent No.: US 6,976,864 B1
(45) Date of Patent: Dec. 20, 2005

(54) SIM CARD SEAT ASSEMBLY

(76) Inventor: Huang-Chou Huang, No. 59, Sec. 1, Jiow Juang St., Nankang Dist., Taipei (TW)

(*) Notice: Subject to any disclaimer, the term of this patent is extended or adjusted under 35 U.S.C. 154(b) by 0 days.

(21) Appl. No.: 10/970,917

(22) Filed: Oct. 22, 2004

(51) Int. Cl.⁷ .......................................... H01R 13/62
(52) U.S. Cl. .................................................. 439/326
(58) Field of Search ................ 439/326, 630, 439/159, 331, 330, 332–336, 341, 376, 911, 439/946; 235/482, 475, 479, 441

(56) References Cited

U.S. PATENT DOCUMENTS

| | | | | |
|---|---|---|---|---|
| 5,451,168 A | * | 9/1995 | Shuey | 439/159 |
| 5,603,629 A | * | 2/1997 | DeFrasne et al. | 439/331 |
| 5,984,707 A | * | 11/1999 | Kuwata | 439/326 |
| D423,455 S | * | 4/2000 | Konno et al. | D13/147 |
| 6,149,466 A | * | 11/2000 | Bricaud et al. | 439/630 |
| 6,174,188 B1 | * | 1/2001 | Martucci | 439/326 |
| 6,220,882 B1 | * | 4/2001 | Simmel et al. | 439/326 |
| 6,669,494 B2 | * | 12/2003 | Abe | 439/159 |
| 6,685,490 B1 | * | 2/2004 | Xue et al. | 439/159 |
| 6,869,302 B2 | * | 3/2005 | Bricaud et al. | 439/326 |
| 6,881,086 B2 | * | 4/2005 | Ohashi | 439/326 |
| 6,913,479 B1 | * | 7/2005 | Su et al. | 439/326 |

* cited by examiner

Primary Examiner—Alexander Gilman
(74) Attorney, Agent, or Firm—Alan D. Kamrath; Nikolai & Mersereau, P.A.

(57) ABSTRACT

A SIM card seat assembly has a base, an insert and a cover. The insert is pivotally connected to the base. The cover is slidably connected to the insert. A SIM card is mounted between the cover and the insert. The insert securely holds the SIM card and keeps the SIM card from releasing from the insert. The cover engages the base to securely hold the insert and the SIM card inside the SIM card seat assembly.

1 Claim, 5 Drawing Sheets

SIM CARD SEAT ASSEMBLY

BACKGROUND OF THE INVENTION

1. Field of the Invention

The present invention relates to a SIM card seat assembly that securely holds a SIM card so the SIM card will not slip out of the SIM card seat assembly.

2. Description of Related Art

Cell phones have become indispensable tools in most parts of the industrialized world. Most cell phones have a SIM card seat and a SIM card. The SIM card seat is installed in the cell phone to hold a SIM card. The SIM card must be installed in the cell phone before the cell phone can be used.

With reference to FIG. 5, the SIM card seat comprises a base (40) and a cover (50). The base (40) and the cover (50) are connected pivotally to each other.

The base (40) has a top surface (not numbered), two side edges (not numbered), multiple latch tabs (not numbered), multiple holes (42), multiple tabs (43) and multiple contacts (431). The latch tabs are formed respectively on and extend up from the side edges, and each latch tab has a latch hole (41). The holes (42) are formed on the top surface of the base (40). The tabs (43) are formed from the base (40), extend respectively into the holes (42) to form teeth-like protrusions and have an inner surface (not numbered). The contacts (431) are formed on the inner surface respectively of the tabs (43).

The cover (50) has two side edges (not numbered), two sidewalls (51) and multiple protruding lips (52). The sidewalls (51) are formed on the each side edge of the cover (50). The protruding lips (52) are formed on the sidewalls (51) and respectively engage the latch holes (41) in the latch tabs on the base (40).

A SIM card (not shown) is placed on the top surface of the base (40), and the cover (50) is closed and attached to the base (40). The protruding lips (52) on the cover (50) engage the holes (41) in the base (40) and hold the SIM card in the SIM card seat. The cell phone uses this SIM card to communicate with cells in a cell phone network.

However, opening and closing the cover (50) gradually deforms the protruding lips (52) on the cover (50), and the deformed protruding lips (52) do not engage the holes (41) in the base (40) very securely. Eventually, the protruding lips (52) easily disengage from the holes (41), and the SIM card will not stay in the SIM card seat. Consequently, the cell phone will not communicate with cells in the cell phone network.

To overcome the shortcomings, the present invention provides a SIM card seat assembly to mitigate the aforementioned problems.

SUMMARY OF THE INVENTION

The primary objective of the present invention is to provide a SIM card seat assembly that will not release a SIM card installed in the SIM card seat even after extended use of the SIM card seat assembly.

The SIM card seat assembly comprises a base, an insert and a cover. The insert is pivotally connected to the base. The cover is slidably connected to the insert. A SIM card is mounted between the cover and the insert. The insert securely holds the SIM card and keeps the SIM card from releasing from the insert. The cover engages the base to securely hold the insert and the SIM card inside the SIM card seat assembly.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
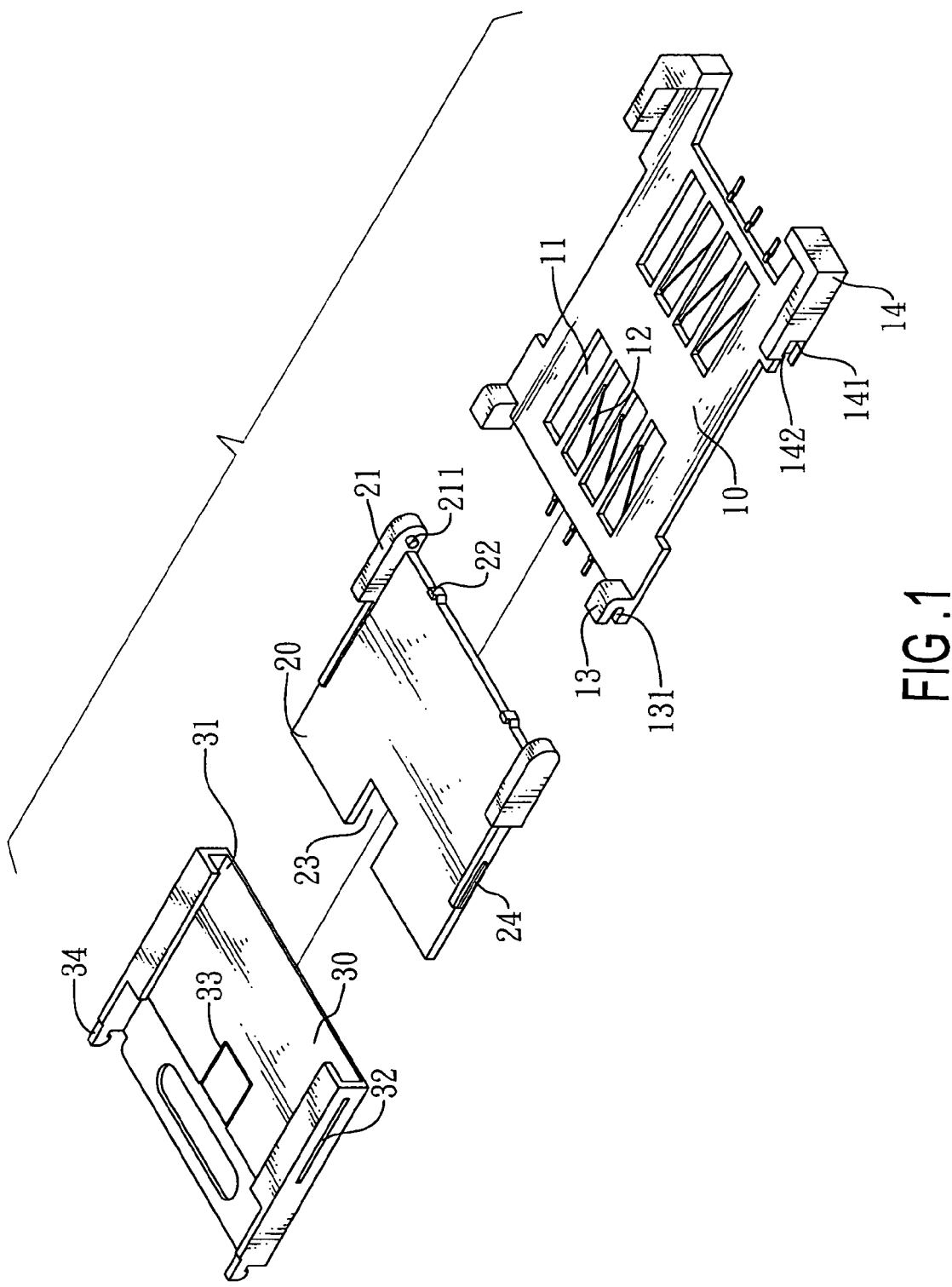
FIG. 1 is a partially exploded perspective view of a SIM card seat assembly in accordance with the present invention.
Figure 3:
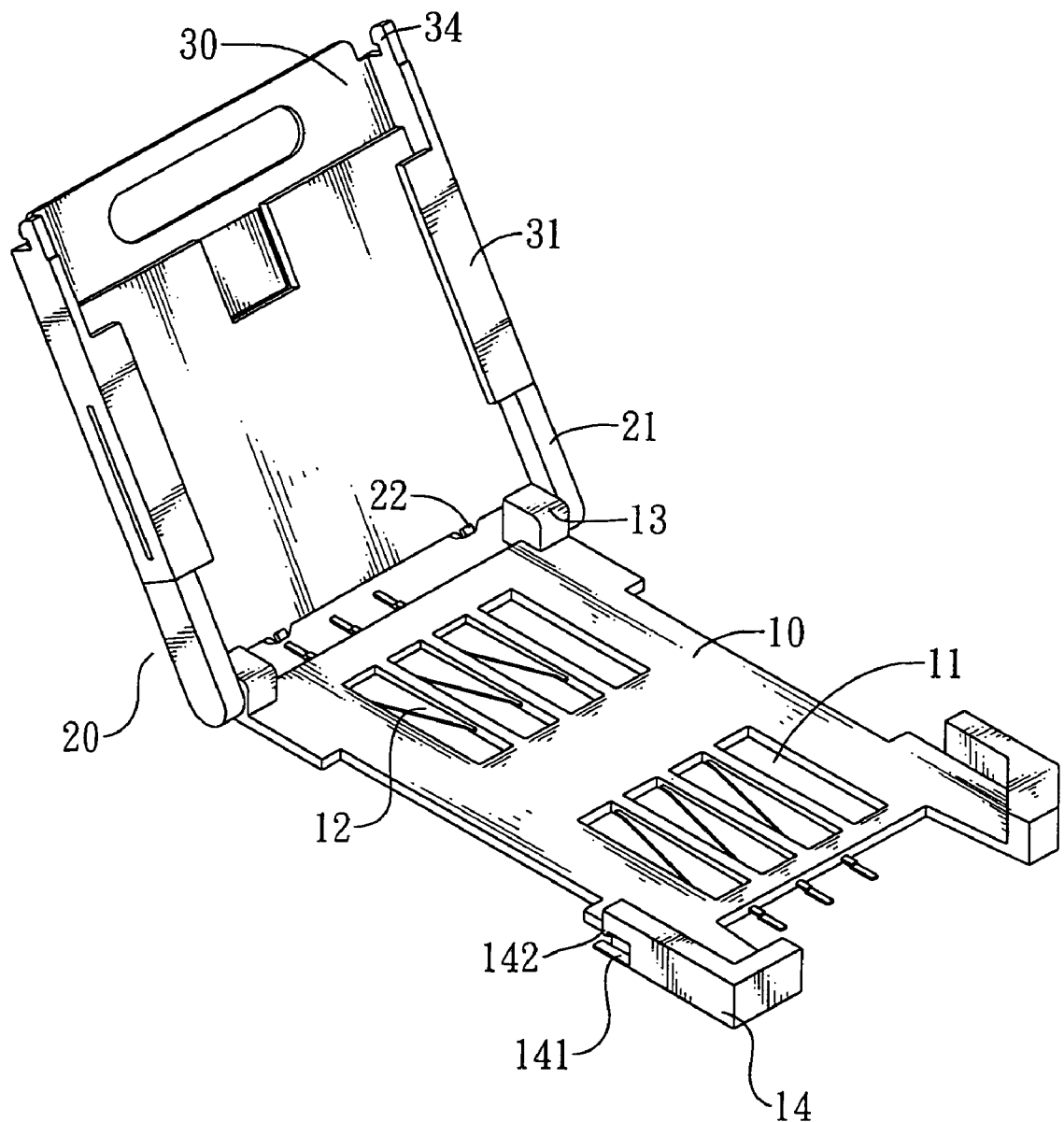
FIG. 3 is a perspective view of the SIM card seat assembly in FIG. 1 open.

With reference to FIGS. 1 and 3, a SIM card seat assembly in accordance with the present invention comprises a base (10), an insert (20) and a cover (30).

The base (10) has a top surface, holes (11), contacts (12), a front edge, a rear edge, two gudgeons (13) and two latch blocks (14). The holes (11) are formed in the top surface of he base (10). The contacts (12) are mounted respectively in the holes (11). The gudgeons (13) and the latch blocks (14) are formed respectively on the front edge and the rear edge of the base (10) and extend up from the top surface of the base (10). Each gudgeon (13) has a slot (131), and each latch block (14) has a recessed notch (141). The recessed notch (141) has an opening and a lip (142). The lip (142) is formed in the opening of the recessed notch (141).

Figure 2:
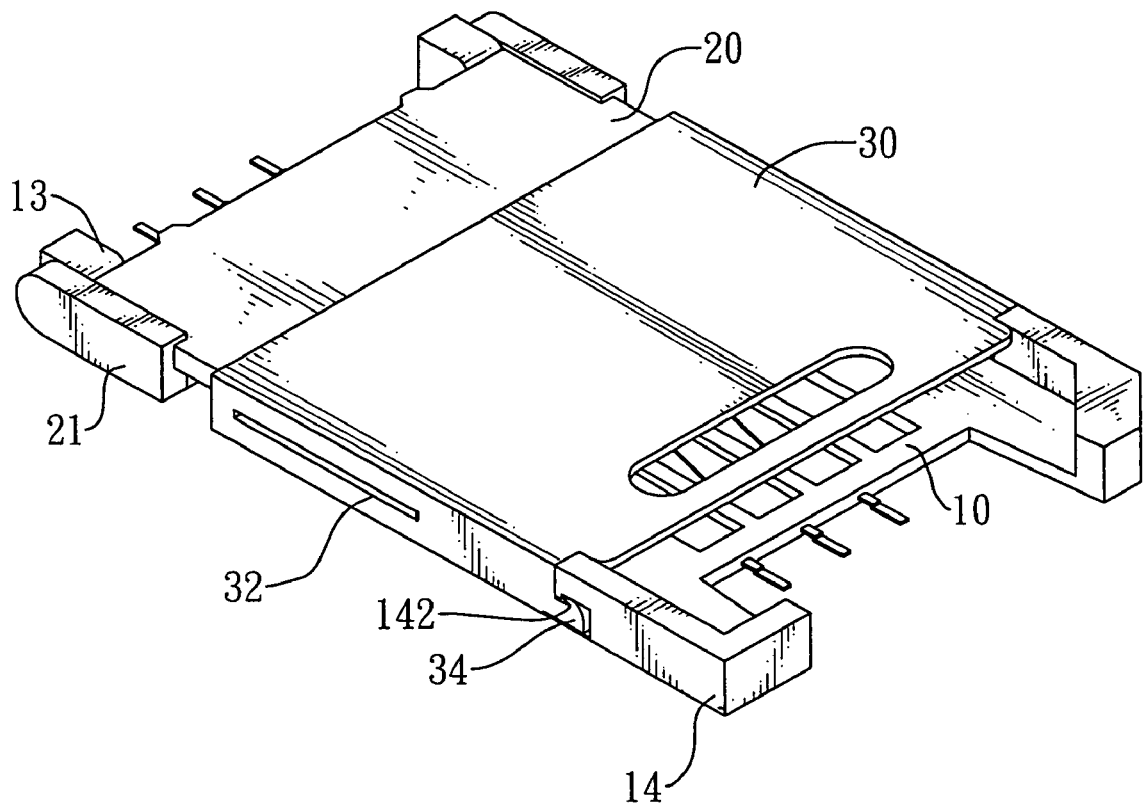
FIG. 2 is a perspective view of the SIM card seat assembly in FIG. 1 closed.
Figure 4:
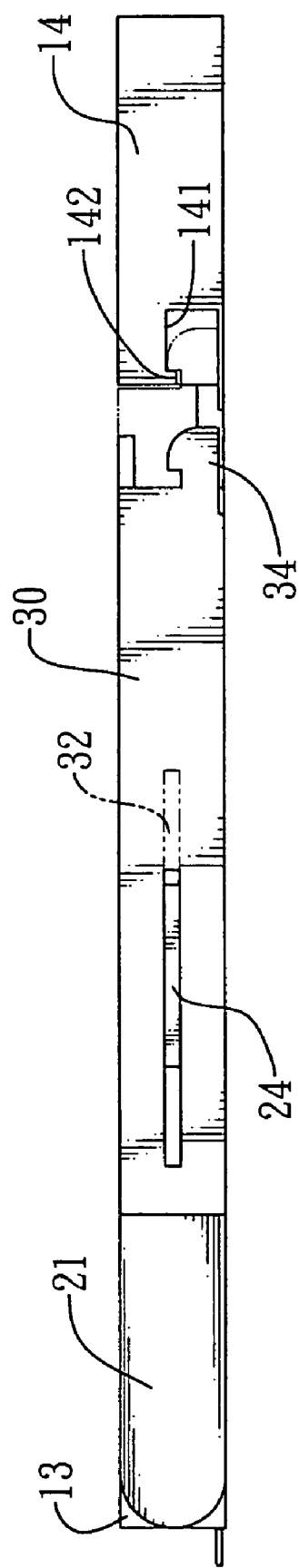
FIG. 4 is a right side view of the SIM card seat assembly in FIG. 2.
Figure 5:
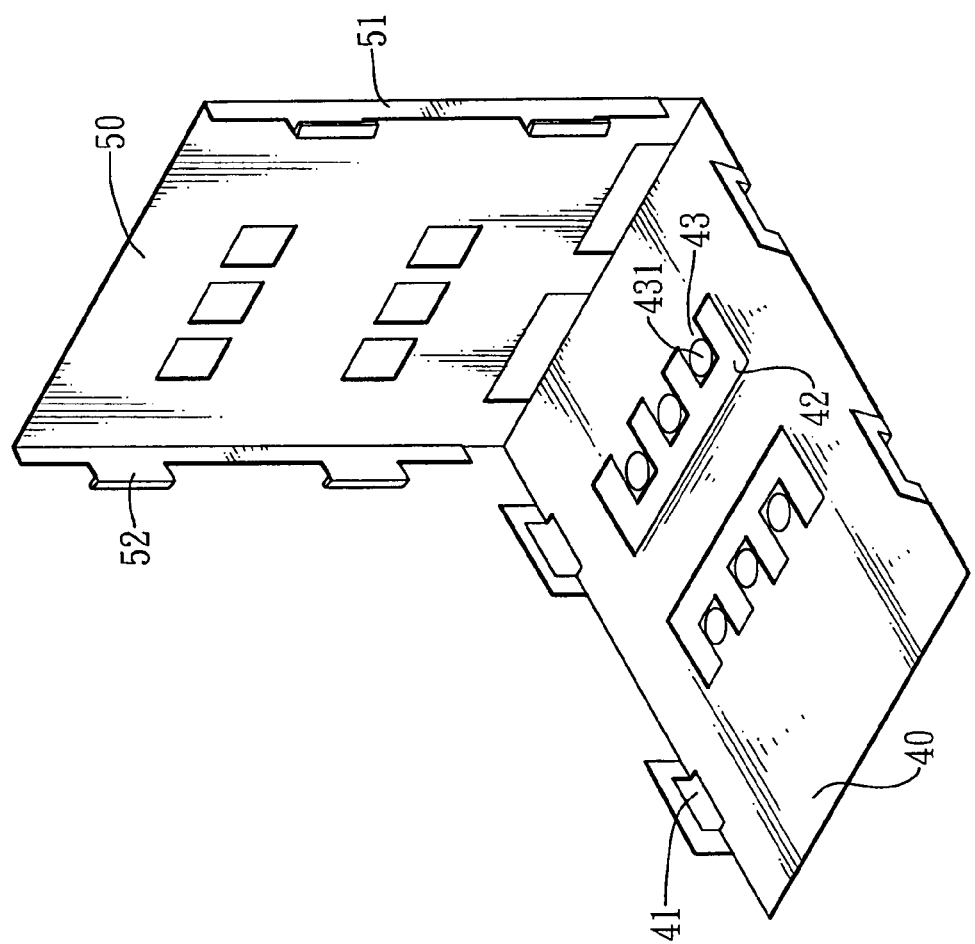
FIG. 5 is a perspective view of a conventional SIM card seat assembly in accordance with the prior art.

With further reference to FIGS. 2 and 4, the insert (20) is pivotally connected to the base (10) and has a front edge, a rear edge, a right edge, a left edge, a top surface, a notch (23), two positive stops (21), two bosses (22) and two ribs (24). The notch (23) is formed in the front edge of the insert (20). The positive stops (21) are formed respectively on the right edge and left edge of the insert (20) near the rear edge of the insert (20) and extend out of the top surface of the insert. Each positive stop (21) has a pintle (211). The pintles (211) are formed respectively on the positive stops (21), extend toward each other and are rotatably mounted in the slots (131) in the gudgeons (13) on the base (10) to connect the insert (20) pivotally to the base (10). The bosses (22) are formed on the rear edge of the insert (20) and extend out of the top surface of the insert (20). The ribs (24) are formed longitudinally respectively on the right edge and the left edge of the insert (20).

The cover (30) is slidably attached to the insert (20) and has a top surface, a raised area (33), a front edge, a right edge, a left edge and two slots (31). The raised area (33) is formed on and extends out from the top surface of the cover (30) and corresponds to the notch (23) in the insert (20). The raised area (33) is selectively mounted in the notch (23) in the insert (10) to keep the cover (30) from moving any further toward the insert (20). The slots (31) are formed respectively on the right edge and the left edge of the cover (30). Each slot (31) has a bottom, a hole (32), a front end and a hook (34). The holes (32) are formed respectively through the bottom of the slots (31) in the cover (30), and the ribs (24) on the insert (20) are mounted slidably respectively in the slots (31) to connect the cover (30) to the insert (20). The hooks (34) are formed respectively on the front ends of the slots (31) near the front edge of the cover (30). The hooks (34) are mounted respectively in the recessed notches (141) in the base (10) to selectively connect the cover (30) to the base (10).

When a SIM card with a front edge, a rear edge and two side edges slides into the cover (30), side edges slide longitudinally in the slots (31) in the cover (30), and the rear edge abuts the bosses (22). The cover (30) with the SIM card is pushed toward the base (10), and the hooks (34) on the cover (30) slide respectively into the recessed notches (141). When the hooks (34) engage the lips (142) in the recessed notches (141), the cover (30) is securely connected to the base (10). The front edge of the SIM card is held firmly in place by the latch blocks (14) on the base (10) to keep the SIM card from sliding out of the base (10). Consequently, the SIM card is securely held in the SIM seat assembly so the cell phone can be used. With the engagements of the hooks (34) of the cover (30) with the lips (142) in the recessed notches (141), the cover (30) will not disengage from base (10) even after a period term of using. Accordingly, the SIM card is securely held inside and is kept from the SIM card seat in accordance with the present invention.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A SIM card seat assembly comprising:
   a base having
      a top surface;
      multiple holes formed in the top surface;
      multiple contacts mounted respectively in the holes;
      a front edge;
      a rear edge;
      two gudgeons formed on the front edge of the base, extending up from the top surface of the base and respectively having a slot; and two latch blocks formed on the rear edge of the base, extending out the top surface of the base, and respectively having multiple recessed notches each having
         an opening; and
         a lip formed in the opening;
   an insert pivotally connected to the base and having
      a front edge;
      a rear edge;
      a right edge;
      a left edge;
      a top surface;
      a notch formed in the front edge of the insert;
      two positive stops formed respectively on the right edge and left edge of the insert near the rear edge of the insert, extending out of the top surface of the insert and having
         pintles formed respectively on the positive stops, extending toward each other and rotatably mounted in the slots in the gudgeons to connect the insert pivotally to the base;
      two bosses formed on the rear edge of the insert and extending out of the top surface of the top surface; and
      two ribs formed longitudinally respectively on the right edge and the left edge of the insert; and
   a cover slidably attached to the insert and having
      a top surface;
      a raised area formed on and extending out from the top surface of the cover and corresponding to and selectively mounted in the notch in the insert to keep the cover from moving any further toward the insert;
      a front edge;
      a right edge;
      a left edge; and
      two slots formed respectively on the right edge and the left edge of the cover and having
         a bottom;
         multiple holes formed respectively through the bottom of the slots, wherein the ribs on the insert are slidably mounted in the holes to connect the cover to the insert; and
         multiple hooks formed respectively on the front ends of the slots near the front edge of the cover.

* * * * *